United States Patent [19]

Suzuki et al.

[11] 4,034,410
[45] July 5, 1977

[54] MAGNETIC RECORDING MEDIUM

[75] Inventors: Kazuo Suzuki; Shinichiro Akuta, both of Ohtsu, Japan

[73] Assignee: Kanegafuchi Kagaku Kogyo Kabushiki Kaisha, Osaka, Japan

[22] Filed: Apr. 10, 1975

[21] Appl. No.: 566,720

[30] Foreign Application Priority Data

Apr. 10, 1974  Japan .............................. 49-41303

[52] U.S. Cl. ................................. 360/55; 360/131
[51] Int. Cl.² ....................... G11B 5/62; G11B 5/00
[58] Field of Search ............... 360/55, 57, 66, 131, 360/133, 134, 123, 125; 235/61, 11 D

[56] References Cited

UNITED STATES PATENTS

| | | | |
|---|---|---|---|
| 3,016,310 | 1/1962 | Andrews | 360/131 |
| 3,023,166 | 2/1962 | Duinker | 36/131 |
| 3,047,429 | 7/1962 | Stoller | 360/131 |
| 3,185,775 | 5/1965 | Camras | 360/131 |
| 3,723,668 | 3/1973 | Ritchey | 360/66 |
| 3,772,471 | 11/1973 | Imai | 360/118 |

*Primary Examiner*—Jay P. Lucas
*Attorney, Agent, or Firm*—Moonray Kojima

[57] ABSTRACT

A magnetic recording medium comprising a magnetic sheet of domain sized particles of at least one member selected from the group consisting of barium ferrite, strontium ferrite and lead ferrite, dispersed uniformly in an organic binder, and a ferromagnetic plate bonded to one surface with the other surface of the sheet being magnetizable at selected sites with the magnetization being in a direction substantially perpendicular to the surfaces.

2 Claims, 7 Drawing Figures

MAGNETIC RECORDING MEDIUM

BACKGROUND OF THE INVENTION

This invention relates to a magnetic recording medium.

Heretofore, magnetic tapes and discs have been widely used as recording media. They generally have consisted of polyester films, stretched PVC films, etc, coated with a magnetic material in which finely divided particles of a ferromagnetic substance such as gamma-$Fe_2O_3$, $Fe_3O_4$, etc are dispersed. Recording has been by magnetization within the plane of the surface of the film, for example.

From the viewpoint of magnetic characteristics, the above types of materials may be termed semi-hard magnetic materials, and can be readily magnetized. Since the material does not self-demagnetize, in an external magnetic field of about 100 oe (oersted), as would a soft magnetic material, the material has the advantages of high density recording, and easy repeated recording and erasure. However, this type of magnetic recording material also has numerous disadvantages. For example, when the magnetic recording tape is transported with the magnetically coated surface in contact with the magnetic head having an air gap, abrasion of the magnetic head and of the magnetically coated surface is inevitable, thereby resulting in deterioration of the recording characteristics. Furthermore, recorded information can be readily changed, either deliberately or accidently, by use of an external magnetic field.

SUMMARY OF THE INVENTION

Accordingly, an object of the invention is to eliminate or reduce the foregoing and other disadvantages and deficiencies of the prior art.

These and other objects are attained by this invention which encompasses a magnetic sheet of a plurality of domain sized particles of at least one member selected from the group consisting of barium ferrite, strontium ferrite and lead ferrite, uniformly dispersed in an organic binder and a ferromagnetic plate bonded to one surface of the sheet, with the other surface being magnetizable at selected sites, in a direction substantially perpendicular to the surfaces. Means may be provided for recording information on the sheet by magnetizing selected locations to have the same magnetic pole, with reading means provided to read only that magnetic pole at the selected locations and erasure being by magnetization of all locations to have opposite magnetic poles from that readable by the reading means.

A feature of this invention is the use of the sheet of particles of barium ferrite, strontium ferrite or lead ferrite or mixtures thereof and the ferromagnetic plate bonded to one surface thereof with the direction of magnetization at selected sites being substantially perpendicular to the surfaces.

Another feature of the invention is the substantially permanent magnetic characteristic of the magnetic medium with the recording, reading and erasure of information being by other than ordinary air gap type devices.

A further feature of the invention is the inducing of the same magnetic pole at selected locations for recording of information, use of means to detect or read that magnetic pole for reading recorded information and the erasure of the recorded information by inducing magnetic poles at all locations which cannot be read or detected by the detecting means.

The foregoing and other features, advantages and objects of the invention will be further explained in the detailed description and drawing.

DETAILED DESCRIPTION OF PREFERRED EMBODIMENTS

Figure 1:
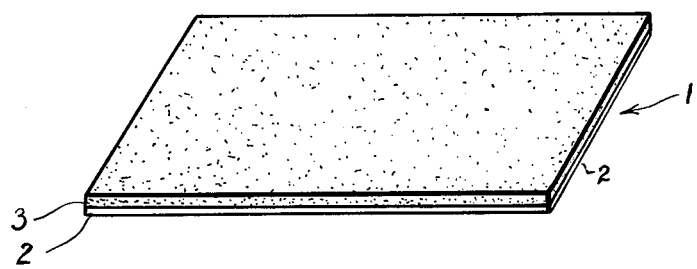
FIG. 1 depicts in perspective view, an illustrative embodiment of the invention.

Turning to FIG. 1 there is depicted a molded sheet 1, comprising layer 3 and bonded to one surface thereof a ferromagnetic plate 2. The layer 3 comprises an organic binder, such as for example, synthetic rubber, chloroprene, chlorinated polyethylene, poly vinyl chloride, etc. Uniformly dispersed throughout the binder are a plurality of domain sized particles of at least one of barium ferrite, strontium ferrite and lead ferrite. The amount of ferrite to binder can be varied. A suitable ratio can be 5 to 65% by volume particles and 95 to 35% by volume binder. The barium ferrite, strontium ferrite and lead ferrite used herein can be prepared by using any known technique. A favorable method is described in Ser. No. 556,017 assigned to the Assignee hereof. The ferrite may be characterized as being a hard magnetic material. The sheet has high coercive force and high residual magnetic flux. The plate 2 is made of a soft magnetic material, such as iron.

Thus, once magnetized, the ferrite particles will tend to remain magnetized until demagnetized or its direction of magnetization changed. The plate 2, does not tend to hold its magnetization. Instead it is used herein to facilitate the magnetization in a perpendicular direction of the ferrite particles. It is important that the particles have a strong priority direction of magnetization, which is substantially perpendicular to the surfaces of the sheet. With such orientation, and the permanent magnetic property of the particles, and the presence of plate 2 to facilitate magnetization of the particles in the perpendicular direction, the recording, reading and erasure of information by change of magnetic states cannot be accomplished by a magnetic head having the ordinary air gap. The recording, reading and erasure may be done by an electromagnetic means discussed hereinbelow in greater detail.

Turning now to FIGS. 2A, 2B, 2C, 2D, 2E and 2F, there is depicted molded sheet 1, a magnetizing means 4 comprising energizing coil 5 connectable to a source of electrical energy not shown, and a soft magnetic core 6. The magnetizing means may be a suitable ordinary type ferromagnetic magnet, such as a single wound electromagnet with a high d-c capacitor connected thereto. Detecting means 7, connectable to a display means not shown, may be any means which is capable of detecting a particular magnetic pole, such as a magnetic proximity switch or switch hole device. Thus, the detector will detect, for example, only a north pole or only a south pole, depending on the adjustment thereto. For example, when a north pole is in the vicinity of the detecting means 7, a signal is produced to indicate the presence of information, and when a south pole is present, there will be no signal produced, thus indicating no information is present. The device may be controlled to detect either one or the other pole.

Figure 2:
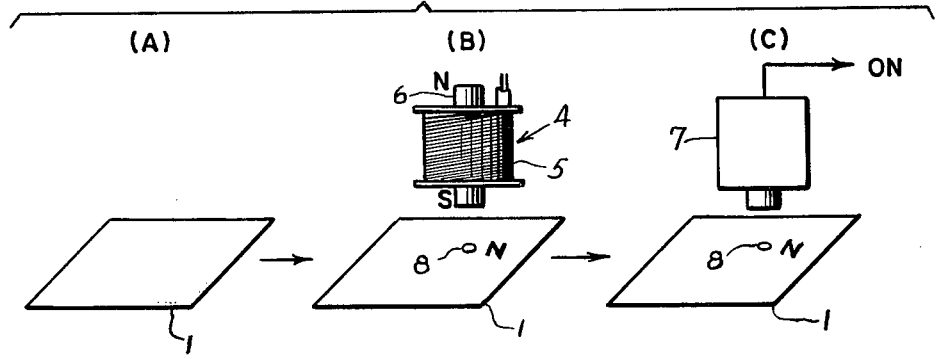
FIGS. 2A, 2B, 2C, 2D, 2E, 2F depict recording, reading and erasure of magnetic states of the magnetic sheet.
Figure 2:
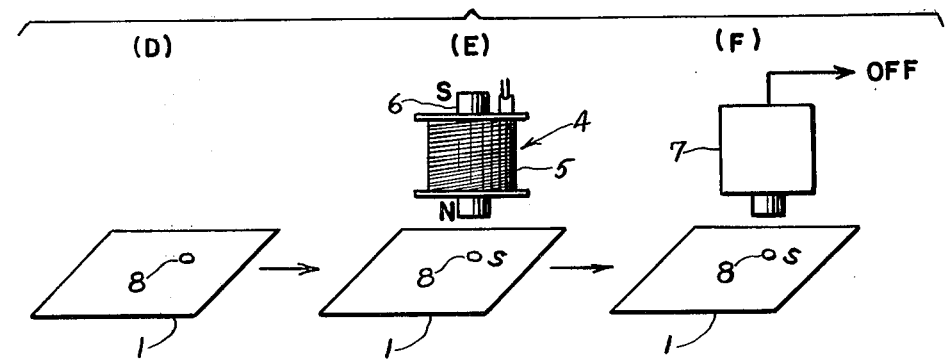

To record information, as shown in FIG. 2B, electromagnet 4 is energized so that, for example, a south pole appears on core 6 nearest the surface of sheet 1, thereby to induce a north pole at the surface of sheet 1, as shown by spot 8. A plurality of sites 8 can be employed for magnetic poles sites. The ferrite particles being domain sized and oriented to a preferred direction of magnetization perpendicular to the surface, and the plate 2 being of soft magnetic material, the selected sites 8 under the recording means 4 are magnetized in the vertical direction with the north pole at the surface. Information is thus recorded by magnetization of selected sites in the surface in one magnetic direction for one state, and the opposite magnetic direction for the other state.

To read or detect information, the detector 8 is placed in the vicinity of the magnetized sites 8 in sheet 1, as shown in FIG. 2C. The residual magnetic flux is high. The detector 7 is controlled to produce a signal when the direction of magnetization is a north pole in sheet 1. Thus, in the case depicted, the detector 7 will produce a signal indicating the presence of information. As depicted in FIG. 2D, the information is stored in the sheet permanently as a north pole. Thus, unless the magnetic direction is changed by further reverse magnetization by recorder 4, the direction of magnetization remains a north pole at the surface 8, for example, to indicate the presence of information.

To erase the information stored in sheet 1, rather than removing the magnetization from the sites previously magnetized, since there is high coercive force and high residual magnetic flux, it is more advantageous to reverse the direction of magnetization. For example, as depicted in FIG. 2E, the recording means 4 can be electrically reversed to produce a north pole at the core 6 nearest the surface of sheet 1. In this manner, a south pole will be induced at selected sites 8 below core 6. Since detector 7 has the property of detecting only one kind of magnetic pole, in the case of a north pole, when as depicted in FIG. 2E, a south pole appears below it, there will be no output signal produced. Thus, no information is present at the site. Of course, the detector 7 can be controlled to detect only south poles instead of north poles and the opposite procedure will be used.

The erasure is accomplished by setting magnetic poles at all sites to be that which cannot be detected by detector 7. Thus, the non-readable magnetic pole serves as both the non-presence of information state and the erased state, with the readable magnetic pole being the presence of information state.

In using the above invention, it was found that, advantageously, the medium has strong resistance to external magnetic fields. Thus, deliberate or accidental counterfeiting of information or erasure of information can be substantially eliminated. A larger gap is possible between the detector and the recording medium. Thus, non-contact detecting and its consequent advantages are present. Also, stationary reading is feasible, and moving parts may be eliminated. Also, the medium has excellent abrasion resistance.

The foregoing description is illustrative of the principles of the invention. Numerous variations and modifications thereof would be apparent to the worker skilled in the art. All such variations and modifications would be and are to be considered to be within the spirit and scope of the invention.

WHAT IS CLAIMED IS:

1. A magnetic recording system comprising a magnetic sheet of domain sized particles of at least one member selected from the group consisting of barium ferrite, strontium ferrite and lead ferrite, uniformily dispersed in an organic binder, and a ferromagnetic plate bonded to one surface of said sheet, the other surface of said sheet being magnetizable at selected locations, means comprising an electromagnet having a substantially rod shaped core for magnetizing said particles at said selected locations in said other surface in a direction substantially perpendicular to said other surface, thereby to store information in the orientation of magnetic flux in perpendicular magnetic particles, means for detecting only one type of magnetic pole at said selected locations, and means comprising an electromagnet having a substantially rod shaped core for erasing the information stored in said perpendicularly oriented magnetic particles at all locations by changing the type of magnetic pole to be non-detectable by said means for detecting.

2. The system of claim 1, wherein said means for detecting comprises a magnetic proximity switch or hole switch.

* * * * *